(12) United States Patent
McCarty et al.

(10) Patent No.: US 6,935,370 B2
(45) Date of Patent: Aug. 30, 2005

(54) FLUID PRESSURE REDUCTION DEVICE

(75) Inventors: Michael Wildie McCarty, Marshalltown, IA (US); Ted Alan Long, Marshalltown, IA (US); Michael M. Anderson, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 0 days.

(21) Appl. No.: 10/795,831

(22) Filed: Mar. 8, 2004

(65) Prior Publication Data

US 2004/0168730 A1 Sep. 2, 2004

Related U.S. Application Data

(62) Division of application No. 09/931,484, filed on Aug. 16, 2001, now Pat. No. 6,701,957.

(51) Int. Cl.⁷ .............................................. F16K 47/04
(52) U.S. Cl. ...................................... 137/625.3; 138/42
(58) Field of Search ........................ 137/625.3, 625.33; 138/42

(56) References Cited

U.S. PATENT DOCUMENTS

| | | |
|---|---|---|
| 3,451,404 A | 6/1969 | Self |
| 3,513,864 A | 5/1970 | Self |
| 3,514,074 A | 5/1970 | Self |
| 3,688,800 A * | 9/1972 | Hayner et al. ................. 138/42 |
| 3,978,891 A | 9/1976 | Vick |
| 4,068,683 A | 1/1978 | Self |
| 4,079,754 A * | 3/1978 | Porter ........................... 138/42 |
| 4,267,045 A | 5/1981 | Hoof |
| RE32,197 E | 7/1986 | Self |
| 5,687,763 A | 11/1997 | Steinke |
| 5,769,122 A | 6/1998 | Baumann et al. |
| 5,803,119 A | 9/1998 | Steinke |
| 5,941,281 A | 8/1999 | Baumann et al. |
| 6,026,859 A | 2/2000 | Wears et al. |
| 6,095,196 A | 8/2000 | McCarty et al. |
| RE36,984 E | 12/2000 | Steinke |
| 6,161,584 A | 12/2000 | Hemme et al. |

FOREIGN PATENT DOCUMENTS

DE 2728697 1/1979

OTHER PUBLICATIONS

Copy of English–language Abstract for Japanese Publication No. 57192687, published on Nov. 26, 1982, 1 page.
Copy of International Search Report for International Patent Application No. PCT/US02/22472, dated Nov. 7, 2002, 8 pages.

* cited by examiner

Primary Examiner—John Fox
(74) Attorney, Agent, or Firm—Marshall, Gerstein & Borun LLP

(57) ABSTRACT

A fluid pressure reduction device comprises a plurality of stacked disks having a perimeter and a hollow center aligned along a longitudinal axis. Each disk has at least one flow path extending between the hollow center and the perimeter, the flow path including an inlet section, an outlet section, and an intermediate section extending between the inlet and outlet sections. Each flow path intermediate section includes a pressure reducing structure and a recovery zone positioned immediately downstream of the pressure reducing structure.

6 Claims, 12 Drawing Sheets

FLUID PRESSURE REDUCTION DEVICE

CROSS-REFERENCE TO RELATED APPLICATION

This application is a divisional of prior application Ser. No. 09/931,484, filed Aug. 16, 2001 now U.S. Pat. No. 6,701,957.

FIELD OF THE INVENTION

This invention relates to fluid energy dissipation devices and, more particularly, to a fluid pressure reduction device with low acoustical conversion efficiency for gas flows and also for devices with cavitation avoidance and hence low noise properties for liquid flows.

BACKGROUND OF THE INVENTION

In the control of fluid in industrial processes, such as oil and gas pipeline systems, power plants, chemical processes, etc., it is often necessary to reduce the pressure of a fluid. Adjustable flow restriction devices, such as flow control valves and fluid regulators, and other fixed fluid restriction devices, such as diffusers, silencers, and other back pressure devices, are utilized for this task. The purpose of the fluid control valve and/or other fluid restricting device in a given application may be to control fluid rate or other process variables, but the restriction induces a pressure reduction inherently as a by-product of its flow control function.

Pressurized fluids contain stored mechanical potential energy. Reducing the pressure releases this energy. The energy manifests itself as the kinetic energy of the fluid—both the bulk motion of the fluid and its random turbulent motion. While turbulence is the chaotic motion of a fluid, there is momentary structure in this random motion in that turbulent eddies (or vortices) are formed, but rapidly break down into smaller eddies which in turn also break down, etc. Eventually viscosity damps out the motion of the smallest eddies and the energy has been transformed into heat.

Pressure and velocity fluctuations are associated with the turbulent fluid motion that act upon the structural elements of the piping system, causing vibration. Vibration may lead to fatigue failure of pressure retaining components or other types of wear, degradation of performance, or failure of attached instruments. Even when not physically damaging, vibration generates air-borne noise that is annoying to or may damage the hearing of people.

In industrial applications involving liquids, the chief source of noise, vibration, and damage from the pressure reduction of liquids is cavitation. Cavitation is caused in a flow stream when the fluid passes through a zone where the pressure is below its vapor pressure. At this reduced pressure, vapor bubbles form and subsequently collapse after traveling downstream into a zone where pressure exceeds the vapor pressure. The collapsing vapor bubbles may cause noise, vibration, and damage. Ideally, therefore, a fluid pressure reduction device would gradually decrease fluid pressure without dropping below the vapor pressure. In practice, however, such a pressure reduction device is overly difficult and expensive to produce, and therefore fluid pressure reduction devices are known that use multiple stages of pressure reduction. The final pressure drop in such devices is relatively small, which may produce less bubbles and less cavitation.

Currently there are available fluid control valves containing a valve trim in the form of stacked disks forming a fluid pressure reduction device. The stacked disks define a plurality of fluid flow passages designed to create a pressure reduction in the fluid.

One device using stacked disks has tortuous fluid flow paths formed therein. In this device, each of the fluid flow passages is designed with a series of consecutive right angle turns so that the fluid flow changes directions many times in a tortuous path as the path traverses from the inlet to the outlet. In such devices, it is intended for each right angle turn to produce a discrete pressure drop, so that the tortuous path produces a multi-stage pressure reduction. In reality, however, it has been found that the intermediate right angle turns in the flow passages do not effectively create a restriction for staged pressure reduction. In addition, the pressure reduction created by the tortuous path is unpredictable since the pressure reduction effected by each right angle turn is not known. Furthermore, it has been found that the right angle turns may generate pressure and mass flow imbalances and flow inefficiency. The pressure imbalances may lead to the creation of low pressure areas within the device where the fluid momentarily drops below the vapor pressure and subsequently recovers, thereby creating cavitation and causing damage. Flow imbalances affect the pressure drop and fluid velocity through the device, wherein a greater mass flows through some passages to result in increased velocity.

In addition, the tortuous path device has passage outlets oriented so that fluid flow exiting the passages converges. As a result, fluid jets exiting the adjacent outlets may collide to form a larger jet flow having greater stream power, thereby increasing the noise level.

The above recited deficiencies and others in currently available trim devices significantly reduce the effectiveness of these devices in providing desired noise attenuation, vibration reduction, and cavitation damage reduction or elimination. Accordingly, it is desired to eliminate the above deficiencies as well as to provide other improvements in the trim devices so as to enable them to provide enhanced noise attenuation characteristics.

SUMMARY OF THE INVENTION

In accordance with certain aspects of the present invention, a fluid pressure reduction device is provided comprising a plurality of stacked disks having a perimeter and a hollow center aligned along a longitudinal axis. Each disk has at least one flow path extending between the hollow center and the perimeter, the flow path including an inlet section, an outlet section, and an intermediate section extending between the inlet and outlet sections. Each flow path intermediate section includes a pressure reducing structure and a recovery zone positioned immediately downstream of the pressure reducing structure.

In accordance with additional aspects of the present invention, a fluid pressure reduction device is provided comprising a plurality of stacked disks having a perimeter and a hollow center aligned along a longitudinal axis. Each disk has at least one flow path extending between the hollow center and the perimeter, the flow path including an inlet section, an outlet section, and an intermediate section extending between the inlet and outlet sections. Each flow path intermediate section includes a restriction and an associated recovery zone positioned immediately downstream of the restriction, wherein the restriction directs flow substantially toward a center of the associated recovery zone.

In accordance with further aspects of the present invention, a fluid pressure reduction device is provided comprising a plurality of stacked disks having a periphery and a hollow center aligned along a longitudinal axis. Each disk has at least one flow path extending between the hollow center and the perimeter, the flow path including an inlet section, an outlet section, and an intermediate section extending between the inlet and outlet sections, wherein opposing walls of the flow path intermediate section diverge from one another as the flow path intermediate section advances from the inlet section to the outlet section.

In accordance with still further aspects of the present invention, a fluid pressure reduction device is provided comprising a plurality of stacked disks having a perimeter and a hollow center aligned along a longitudinal axis. Each disk has first and second flow paths extending between the hollow center and the perimeter, the first flow path including an inlet section, an outlet section, and an intermediate section extending between the inlet and outlet sections, the second flow path having an inlet section, an outlet section, and an intermediate section extending between the inlet and outlet sections. The second flow path intermediate section and first flow path intermediate section cross at an intersection, and each of the first and second flow path intermediate sections includes a recovery zone downstream of the intersection.

In accordance with yet additional aspects of the present invention, a fluid pressure reduction device is provided comprising a plurality of stacked disks having a thickness and defining a perimeter and a hollow center aligned along a longitudinal axis. Each disk has at least one flow path extending between the hollow center and the perimeter, the flow path including an inlet section, an outlet section, and an intermediate section extending between the inlet and outlet sections. Each flow path extends across the entire thickness of the disk to provide a through-cut flow path, each through-cut flow path dividing the disk into at least first and second blank portions.

In accordance with certain aspects of the present invention, a method of assembling a fluid pressure reduction device is provided comprising forming a plurality of disks having at least one flow path extending between a hollow center and a perimeter of the disk, each flow path including an inlet section, an outlet section, and an intermediate section extending between the inlet and outlet sections, the flow path dividing the disk into at least first and second blank portions, each disk further including a first bridge portion extending between the first and second blank portions. The disks are stacked along an axis and secured together to form a stacked disk assembly. The first bridge portion of each disk in the stacked disk assembly is then removed.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION OF THE PREFERRED EMBODIMENTS

Figure 1:
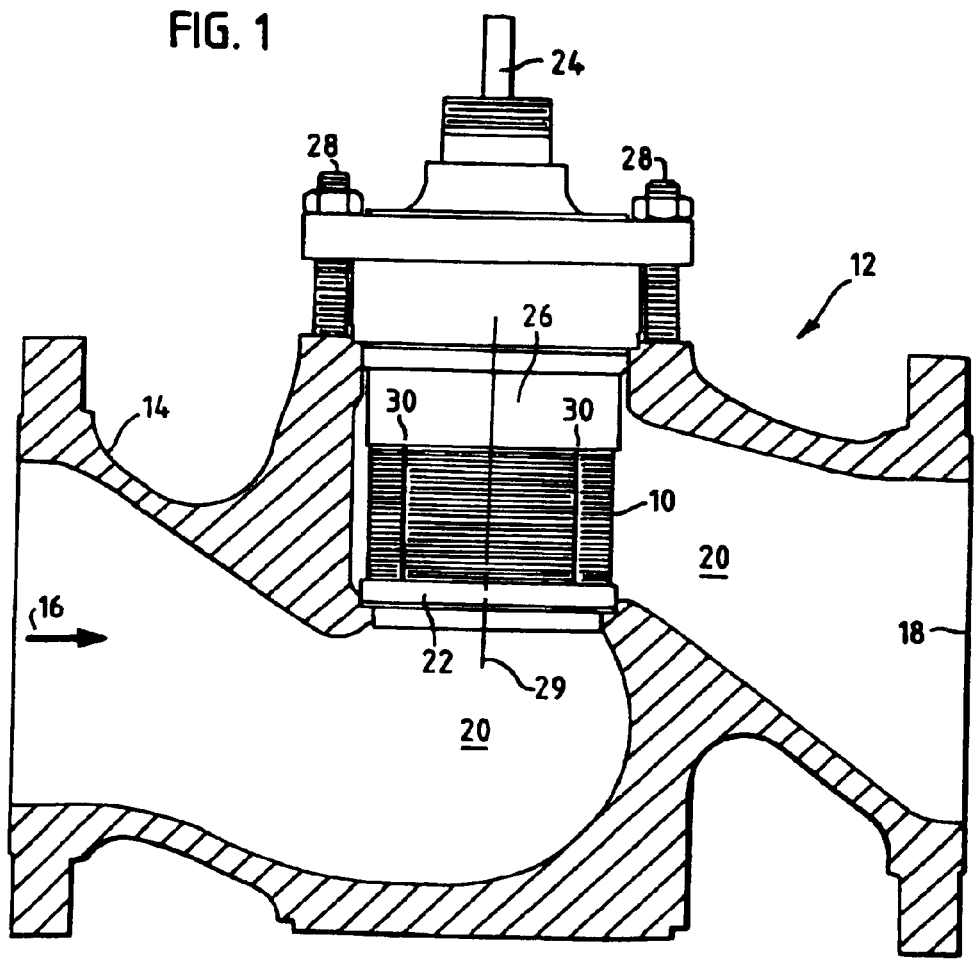
FIG. 1 is a cross-sectional view illustrating a fluid control valve containing a valve trim in the form of stacked disks forming a fluid pressure reduction device in accordance with the teachings of the present invention.

Referring to FIG. 1, there is illustrated a fluid pressure reduction device in accordance with the principles of the present invention in the form of a valve cage 10 having a plurality of stacked disks and mounted within a fluid control valve 12. The stacked disks are concentric about an axis 29. Fluid control valve 12 includes a valve body 14 having a fluid inlet 16, a fluid outlet 18, and a connecting passageway 20 through the valve body. While the fluid flow from the inlet 16 to the outlet 18 is described herein as proceeding from the left to the right as shown by the arrow in FIG. 1, it will be appreciated that the fluid may flow in the reverse direction (i.e., from the right to the left) without departing from the teachings of the present invention.

A seat ring 22 is mounted within the valve body passageway 20 and cooperates with a valve operating member 24 to control fluid flow into the interior and through the exterior of the valve cage 10. The valve cage 10 may be maintained within the valve by conventional mounting means such as a cage retainer 26 and mounting bolts 28 engaging the valve bonnet portion of the valve in a known manner. A series of weld beads 30 on the outside of the valve cage 10 securely maintains the disks in an assembled stack. In a constructed preferred embodiment of the invention, each individual disk is coated with a nickel plating. The nickel plated disks are assembled into a stack which is placed in a fixture and subjected to a suitable stack loading and temperature to fuse the individual plated disks to each other. In other embodiments, the disks may be brazed or welded together. For large disks, a series of bolts or other types of mechanical fasteners may be used to securely maintain the stacked disks assembled.

Figure 2:
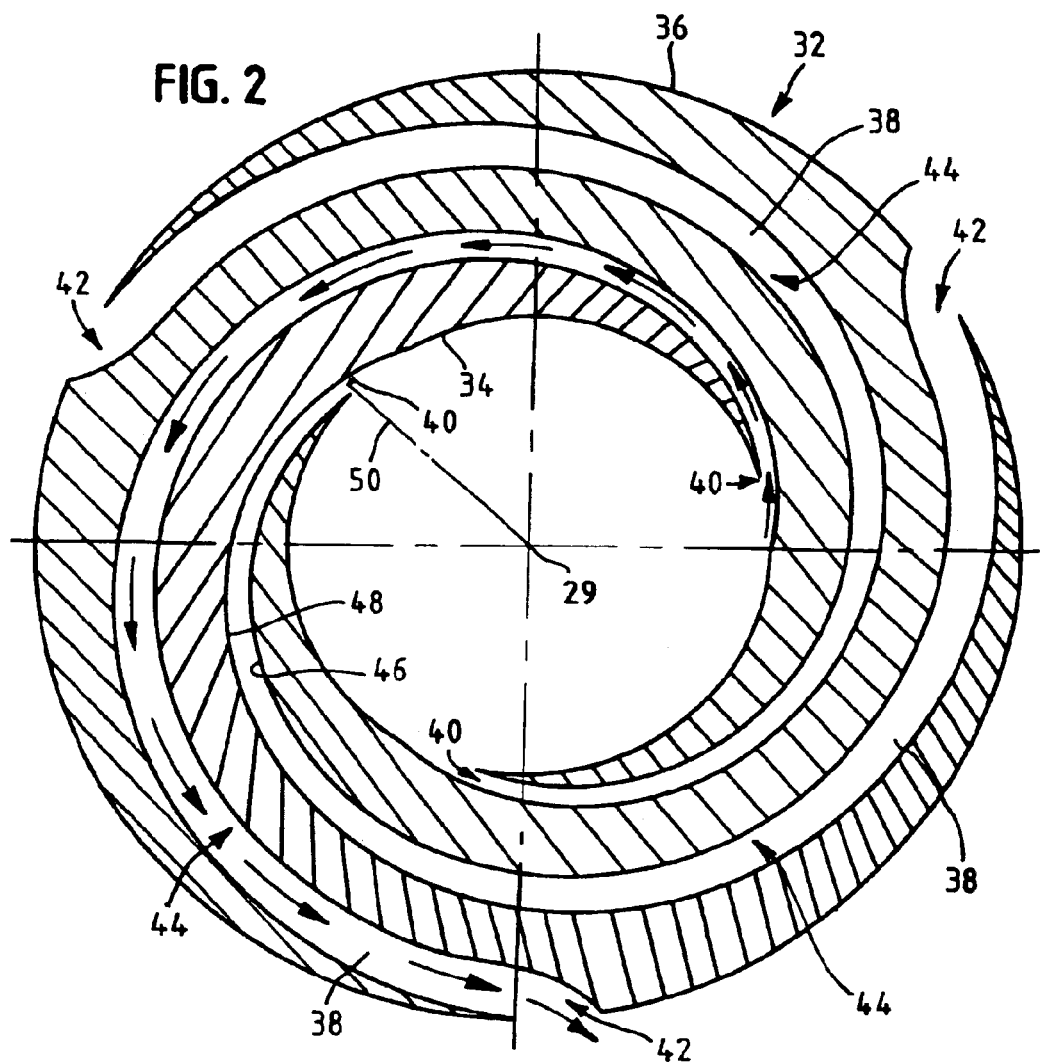
FIG. 2 is a plan view of an annular disk which may be used to form each of the stacked disks in FIG. 1.

The valve cage 10 includes a plurality of the stacked disks, each of which is identical to a disk 32 as shown in FIG. 2. The disk 32 includes a hollow center portion 34 and an annular perimeter 36. A plurality of flow paths 38 is formed in the disk 32. Each flow path 38 has an inlet section 40 positioned near the center portion 34, an outlet section 42 positioned near the perimeter 36, and an intermediate section 44 connecting the inlet section 40 to the outlet section 42. When an identical disk is stacked on top of the disk 32, and rotated sufficiently (for example, rotated 60 degrees with respect to the disk shown in FIG. 2), it will be appreciated that the flow paths 46 are entirely contained within each disk 32. In such an embodiment, each flow path 38 is bounded by an inner wall 46, an outer wall 48, and blank portions of the upper and lower adjacent disks 32.

Figure 5:
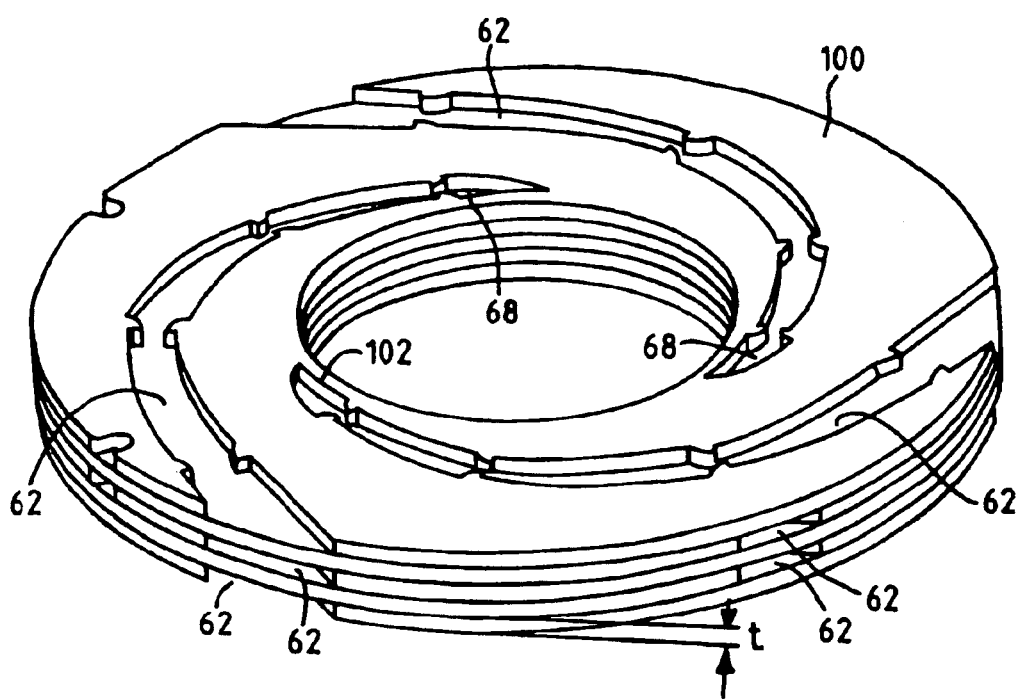
FIG. 5 is perspective view of five disks as in FIG. 4 shown in a stacked assembly.

Each disk 32 has a given thickness "t", as best shown with reference to FIGS. 1 and 5. In the preferred embodiment, each flow path 38 extends across the entire thickness of the disk to provide a through-cut flow path. The through-cut flow paths may be formed by any one of several well-known techniques, including laser cutting. In addition, the flow paths 38 may be provided in a form other than through-cut passages. For example, the flow paths 38 may be formed as grooves or channels in the disk 32.

Each flow path 38 is shaped to increase the amount of drag exerted on the fluid. In the embodiment shown in FIG. 2, the intermediate section 44 of each flow path 38 is formed in a general spiral shape. The spiral shape maximizes the length of the flow path 38 as it travels from the inlet section 40 to the outlet section 42. The initial width of the flow path 38 may be selected to ensure that the fluid quickly attaches to the inner and outer walls 46, 48. In the preferred embodiment, the width of each flow path 38 may gradually expand to control the velocity of the fluid as the pressure is reduced.

In addition, the flow paths 38 are shaped to reduce noise and cavitation. In this regard, the flow paths 38 avoid closely spaced or consecutive abrupt changes in direction, defined herein as an included angle of ninety degrees or less between adjacent flow path portions. In the embodiment illustrated in FIG. 2, each flow path 38 is formed in a gradual curve without any sharp angles formed between adjacent portions of the path.

It will be appreciated that, if a reference line 50 were drawn from the disk axis 29 and a flow path inlet section 40, any portion of the flow path 38 that extends at an angle to the reference line will increase the length of the flow path 38 as it travels from the inlet section 40 to the outlet 42. Any such additional flow path length will increase the amount of drag acting on the fluid, thereby effecting a pressure reduction. When coupled with the absence of closely spaced or consecutive abrupt direction changes in the flow path 38, the result is gradual reduction in fluid pressure without the creation of adjacent areas of high and low pressures which may cause flow unbalance, reduction in passage efficiency, and areas where low pressure regions drop below the liquid vapor pressure, which may lead to flashing and cavitation.

Figure 3:
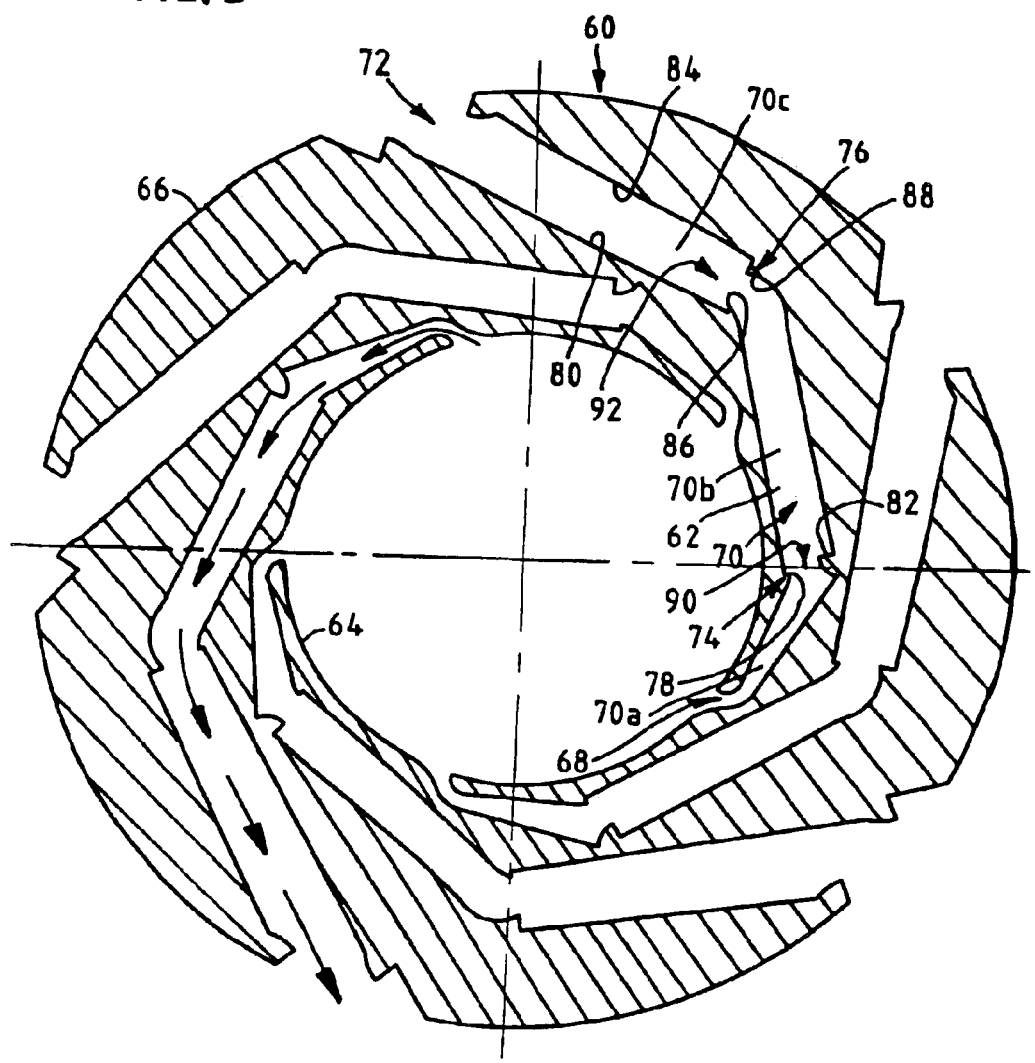
FIG. 3 is a plan view of an alternative embodiment annular disk having restrictions to create multi-stage pressure reduction.

Referring to FIG. 3, an alternative annular disk 60 is shown having fluid flow paths 62 which produce multi-stage pressure reduction. Each disk 60 has a hollow center 64 and a perimeter 66. Each flow path 62 extends from an inlet section 68 located near the hollow center 64, through an intermediate section 70, and to an outlet section 72 positioned near the perimeter 66. In the embodiment illustrated in FIG. 3, the intermediate section 70 of each flow path 62 is formed as a series of flat leg portions 70a, 70b, and 70c. The leg portions 70a–c are associated with recovery following a pressure reduction stage as the fluid flows through the flow path 62. Each angle formed between adjacent flat leg portions 70a–c is greater than 90° (i.e., does not form an abrupt direction change as defined herein). The pressure reducing structures, such as restrictions 74, 76, provided in the intermediate section 70 may create discrete pressure drops and may orient downstream fluid flow. In the illustrated embodiment, the restriction 74 is formed by an inner ridge 78 formed in an inner wall 80 of the flow path 62 and an outer ridge 82 projecting from a flow path outer wall 84.

Similarly, the restriction 76 is formed by an inner ridge 86 formed in the inner wall 80 and an outer ridge 88 formed in the outer wall 84. It will be appreciated that the restrictions 74, 76 may be formed by a single ridge formed in either the inner or outer walls 80, 84, or in any other manner that effects a pressure reduction.

Immediately downstream of each restriction 74, 76 is a recovery zone 90, 92, respectively. The recovery zones 90, 92 do not have any restrictions, abrupt direction changes, or other pressure reducing structure therein. As a result, the recovery zones 90, 92 allow the fluid to reattach to the inner and outer walls 80, 84 of the flow path 62 so that pressure reducing drag once again acts on the fluid. The recovery zones 90, 92 also allow for a more predictable pressure reduction through the following restriction so that pressure levels may be more accurately controlled to avoid dropping below the vapor pressure of the fluid. Still further, any pressure reducing structures located downstream of the recovery zone will be more effective since the fluid flow is once again attached to the walls of the flow path 62. As a result, a true multi-stage fluid pressure reduction device is provided.

The flow path 62 geometry upstream of the restrictions 74, 76 may work in concert with the shape and size of the restrictions 74, 76 to orient the flow in the recovery zones, thus avoiding larger recirculation zones. As shown in FIG. 3, the outer ridge 82 of restriction 74 is larger than the, inner ridge 78. The offset ridges help direct fluid flow toward the center of the downstream recovery zone 90 to provide a more uniform fluid flow velocity profile and to prevent adjacent areas of high and low fluid pressures and overly large recovery zones. One advantage of a more uniform velocity profile is increased predictability for downstream pressure reduction stages.

The outlet sections 72 are positioned and oriented to minimize convergence of fluid exiting from adjacent outlet sections 72. In the embodiment of FIG. 3, the outlet sections are spaced about the periphery of the disk 60. In addition, adjacent outlet sections are directed away from one another, so that fluid exiting the adjacent flow paths 62 diverges.

Figure 4A:
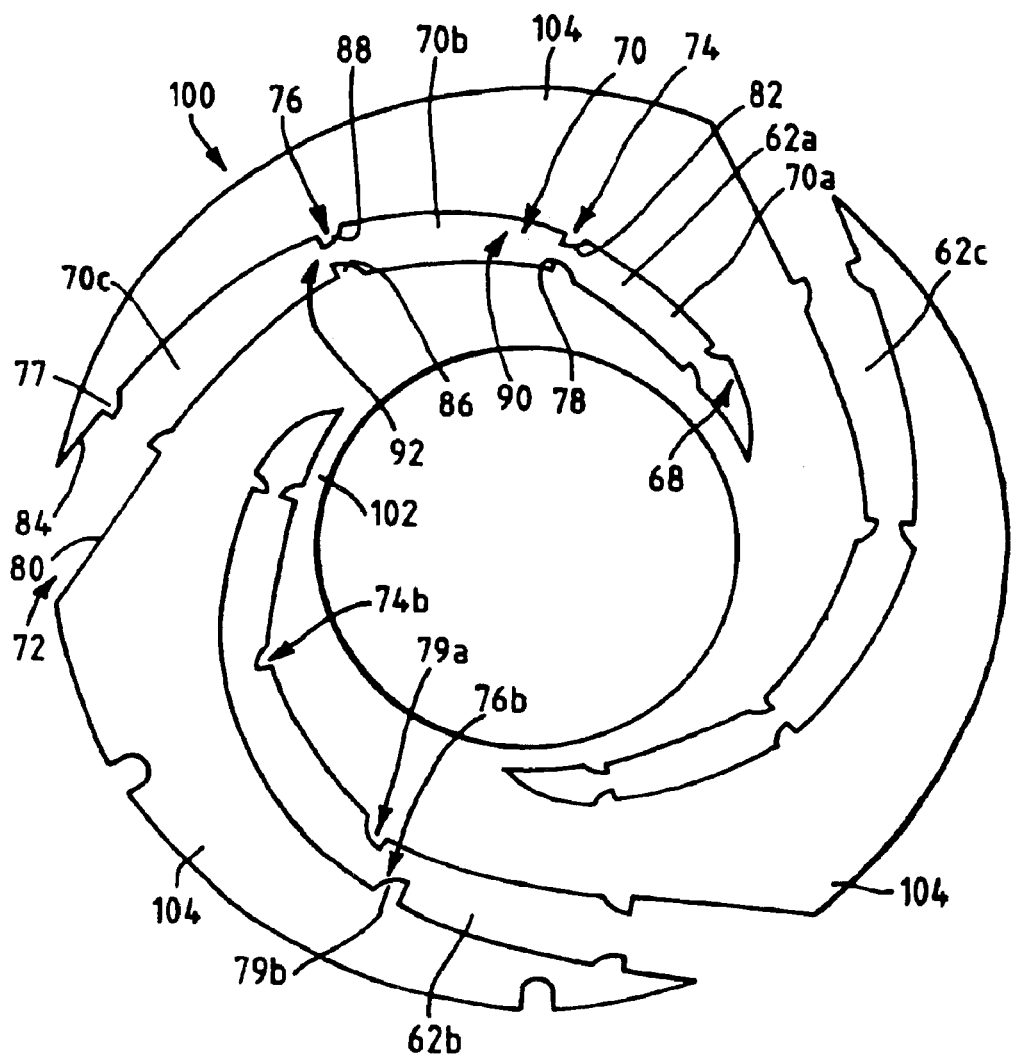
FIG. 4A is a plan view of yet another alternative embodiment annular disk for creating multi-stage pressure reduction including a bridge in the form of an inner ring.

Referring to FIG. 4A, an annular disk 100 is shown which is quite similar to the annular disk 60 of FIG. 3. One of the main differences, however, is in the shape of the intermediate section 70 of each fluid path 62a–c. Instead of being flat, as shown in FIG. 3, the leg portions 70a–c of the current embodiment have a gradual curve so that the flow path 62a–c more closely resembles a spiral.

The flow paths 62a–c of the annular disk 100 of FIG. 4A also include restrictions 74, 76, 77 for producing staged pressure drops. Flow paths 62a and 62c are shown with restrictions formed by first and second ridges projected from opposite flow path walls, similar to the embodiment of FIG. 3. Flow path 62b, however, illustrates alternative restrictions that may be used. Restriction 74b, for example, is formed by a single ridge projecting from one of the flow path walls. Restriction 76b is formed by offset ridges 79a, 79b projecting from opposed flow path walls. In addition to being offset, the ridges 79a, 79b have different profiles. For example, ridge 79b projects farther into the flow path than ridge 79a. The various restriction embodiments may be used to obtain the desired flow characteristics such as pressure drop and fluid flow orientation.

Figure 4B:
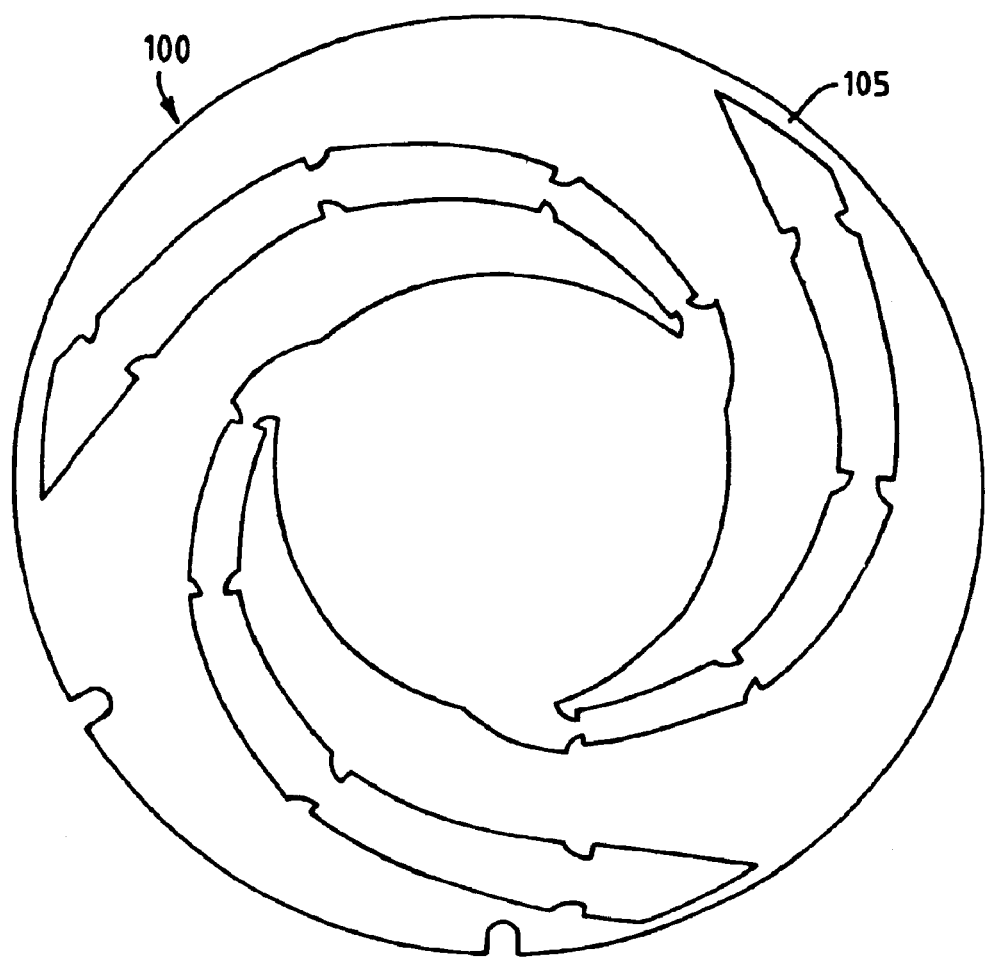
FIG. 4B is a plan view of a disk embodiment similar to FIG. 4A, wherein the annular disk includes a bridge in the form of an outer ring.
Figure 4C:
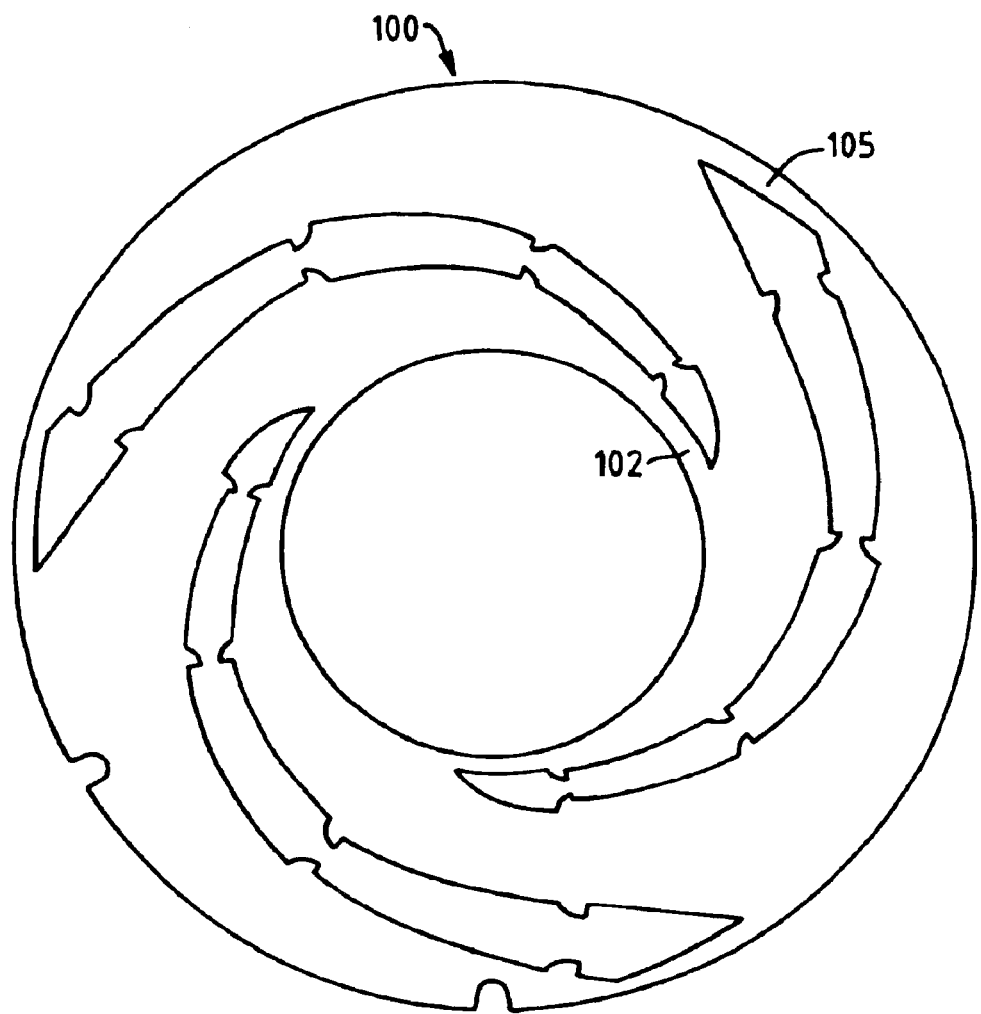
FIG. 4C is a plan view of a disk embodiment similar to FIG. 4A, wherein the annular disk includes two bridges in the form of inner and outer rings.
Figure 4D:
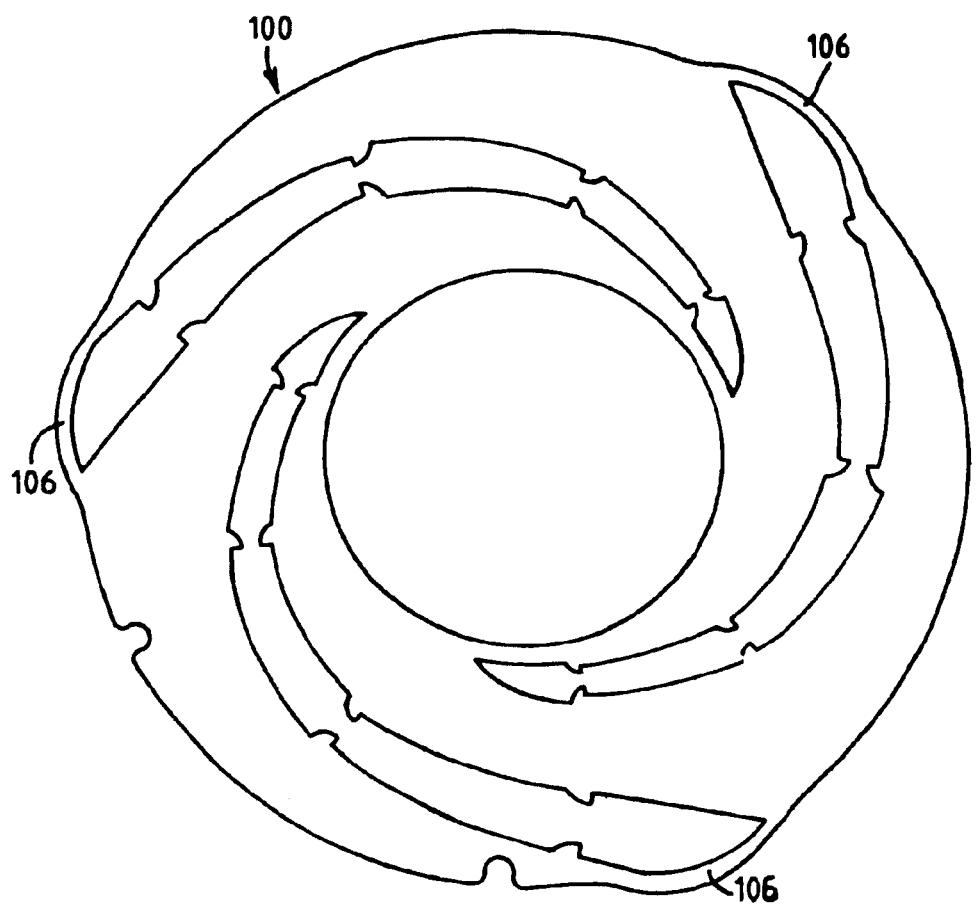
FIG. 4D is a plan view of a disk embodiment similar to FIG. 4A, wherein the annular disk includes a first bridge in the form of an inner ring and a second bridge in the form of a plurality of tabs.

The disk 100 of FIG. 4A also includes a bridge, such as inner ring 102 formed at the hollow center of the disk 100, for facilitating manufacture and assembly of multiple disks to form the trim cage. Without the inner ring 102, each disk would be formed of separate, spiral-shaped blank pieces 104 which would be difficult to transport and assemble. With the inner ring 102, the blank pieces 104 are held in position while the disks are stacked and secured together with relative ease. The hollow center of the trim cage is then enlarged to its final diameter by removing the inner ring 102 to establish fluid communication between the hollow center and the inlet sections 68. Instead of the inner ring 102, each disk may have an outer ring 105 (FIG. 4B) that provides the same benefits as the inner ring. The outer ring 105 is then removed once the disks are assembled. Furthermore, the disks may be provided with both inner and outer rings 102, 105, as illustrated in FIG. 4C, to further stabilize the disks during assembly of the trim cage. Still further, the bridge may be provided in the form of one or more tabs 106 (FIG. 4D) extending between adjacent blank pieces 104. The tabs 105 are removed after the disks are assembled. In any of the foregoing embodiments, the bridge may be removed by any known means, such as by honing, grinding, or machining.

The above-noted bridge is not necessary for alternative flow path constructions, such as grooves or channels, where individual blank pieces are not created. In such alternatives, the flow paths 38 may be formed during casting or formation of the disk, etched into the surface of the disk, or in any other suitable manner.

FIG. 5 provides a perspective view of a plurality of stacked annular disks 100. From FIG. 5, it will be appreciated that adjacent annular disks 100 may be rotated with respect to each other to create the flow paths 62. In the illustrated embodiment, the inner rings 102 of the stacked disks 100 have not yet been removed to expose the inlet sections 68 of each flow path 62.

Figure 6:
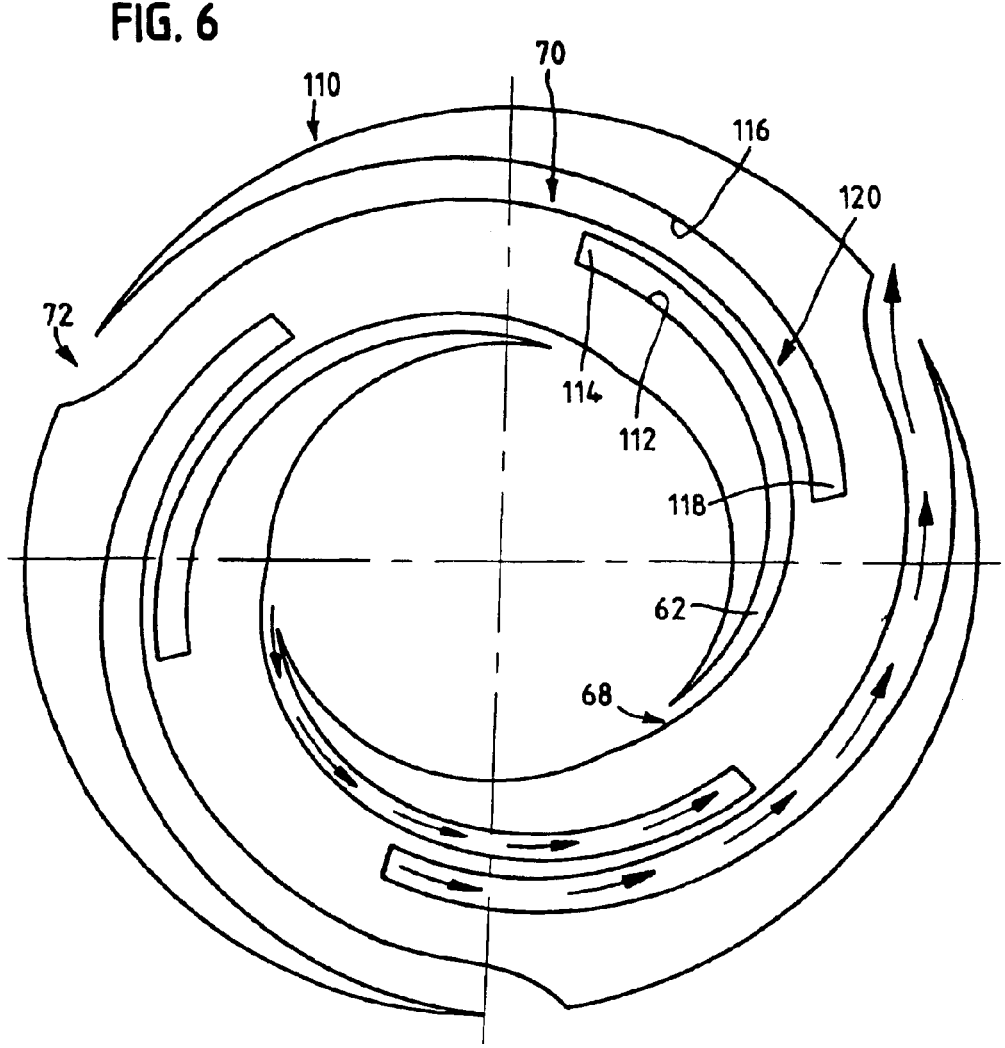
FIG. 6 is a plan view of an alternative embodiment annular disk which allows flow to adjacent stacked disks.
Figure 7:
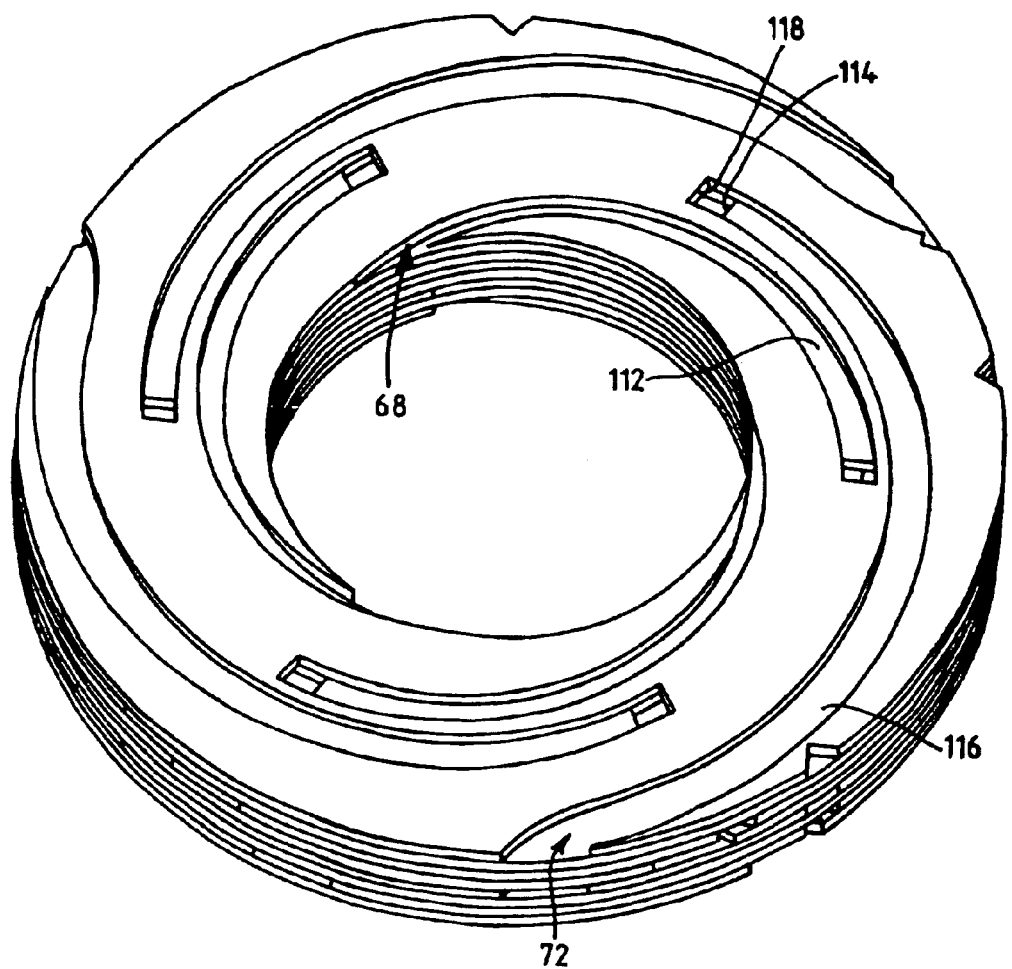
FIG. 7 is a perspective view of eight disks as in FIG. 6 shown in a stacked assembly.

Referring to FIG. 6, an alternative embodiment annular disk 110 is shown in which each fluid flow path 62 traverses more than 1 disk. In the illustrated embodiment, the intermediate section 70 includes an upstream portion 112 having an exit end 114 and a downstream portion 116 having an entrance end 118. As shown in FIG. 7, multiple identical disks 110 may be formed and stacked so that the exit end 114 of the upstream portion 112 formed in a first disk 110 registers with the entrance end 118 of the downstream portion 116 formed in a second disk 110. As a result, fluid will flow from the hollow center through the upstream portion 112 of the first disk to the exit end 114. The fluid will then transfer via the overlapped exit and entrance ends 114, 118 to the downstream portion 116 of a second disk.

The transition between the first and second disks creates a pressure reducing structure in the form of two consecutive 90° direction changes. To minimize the deleterious effects of the closely spaced abrupt direction changes, each downstream flow path portion 116 includes a recovery zone 120 immediately downstream of the entrance end 118. The recovery zones 120 allow the turbulence in the fluid to dissipate and promote reattachment of the fluid to the flow path walls. As a result, even through a series (i.e., a pair) of consecutive abrupt direction changes may be provided, the pressure drop created thereby is more predictable and the gradual effect of drag is enhanced. In an alternative, the exit and entrance ends 114, 118 may be shaped to effect a smooth transition from one disk to the next, thereby avoiding the creation of consecutive abrupt direction changes.

Figure 8:
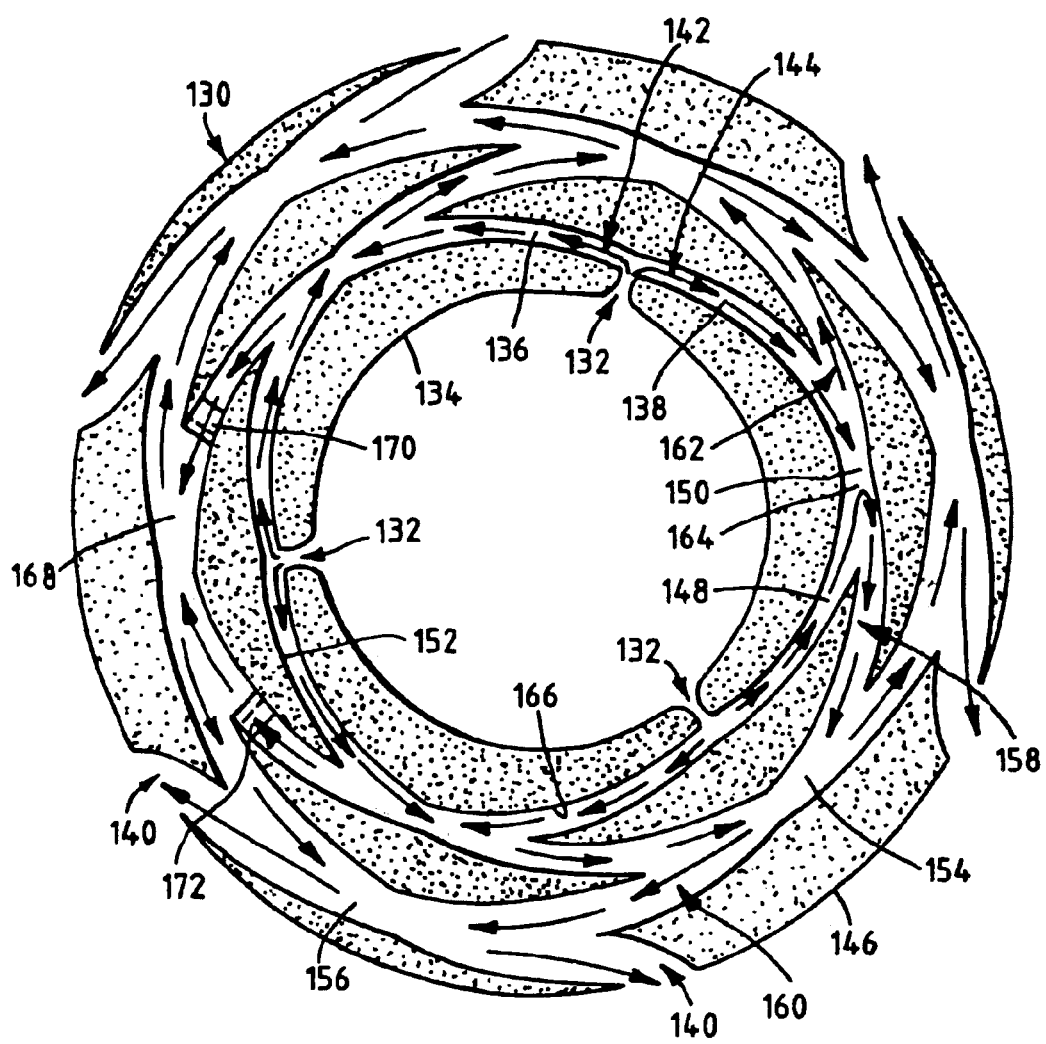
FIG. 8 is a plan view of an alternative embodiment annular disk having intersecting flow paths.

FIG. 8 shows another disk embodiment having intersecting fluid flow paths so that the collision of fluid in the paths reduces fluid pressure. The disk 130 includes three inlet sections 132 formed at the hollow center 134 of the disk. Each inlet section 132 may be a common inlet section for two associated flow paths. For example, common inlet section 132 feeds fluid to flow paths 136, 138. Each flow path 136, 138 has a generally spiral shape from the inlet section 132 to an outlet section 140. Each inlet section 132 is preferably radially aligned with a center point of the hollow center 134, so that each flow path 136, 138 receives approximately one half of the fluid entering the associated inlet section 132. Because of the abrupt direction change between the inlet section 132 and the flow paths 136, 138, recovery zones 142, 144 are provided in each flow path 136, 138 immediately downstream of the inlet section 132.

Each flow path 136, 138 includes pressure reducing structure in the form of flow path intersections. As each flow path 136, 138 extends toward a perimeter 146 of the disk 130, it intersects with other flow paths. For example, flow path 138 intersects with a flow path 148 at intersection 150. Flow path 138 further crosses a flow path 152 at intersection 154. Finally, flow path 138 intersects flow path 136 at intersection 156. Each flow path is provided with sufficient recovery zones downstream of each intersection. For example, flow path 138 is formed with a recovery zone 158 between intersections 150 and 154. In addition, recovery zone 160 is provided between intersections 154 and 156.

In operation, it will be appreciated that the fluid passing through the flow paths will collide at the intersections. The fluid collisions dissipate energy in the fluid and reduce fluid pressure. As a result, the fluid's own motion is used enhance energy dissipation and effect a pressure reduction.

The flow paths may be co-planar so that each intersection creates an abrupt change in direction of the fluid flow. At intersection 150, for example, fluid traveling through flow path 138 may reach the intersection 150 and deflect into the downstream portion of fluid path 148, as suggested by arrow 162. Likewise, fluid in the upstream portion of flow path 148 may reach the intersection 150 and deflect into a downstream portion of the flow path 138, as suggested by arrow 164. Fluid flowing through these paths, therefore, may experience an abrupt change in direction. While normally the abrupt change in direction may result in undesirable flow characteristics, the recovery zones provided downstream of each intersection, such as recovery zone 158, minimize the detrimental effects of such abrupt direction changes and allow the pressure drop associated therewith to be more predictable. As a result, the desired total pressure drop through the disk 130 may be more reliably calculated and designed.

Alternatively, the flow paths may be offset prior to each intersection to reduce or eliminate abrupt direction changes in the fluid flow while still creating additional losses through the action of a fluid shear layer between the two streams. As shown in FIG. 8, flow path 136 may intersect with flow path 166 at intersection 168. Upstream of the intersection 168, flow path 136 may include a ramp 170 which directs fluid flow toward an upper portion of the intersection 168, while flow path 166 may include a ramp 172 which directs fluid flow toward a lower portion of the intersection 168. As a result, fluid flowing from paths 136, 166 into intersection 168 will continue along their respective paths, without abruptly changing direction. While the pressure drop at the intersection 168 is not as great as that associated with planar intersection 150, energy in the fluid is dissipated due to shear forces created by the adjacent fluid flow streams.

Figure 9:
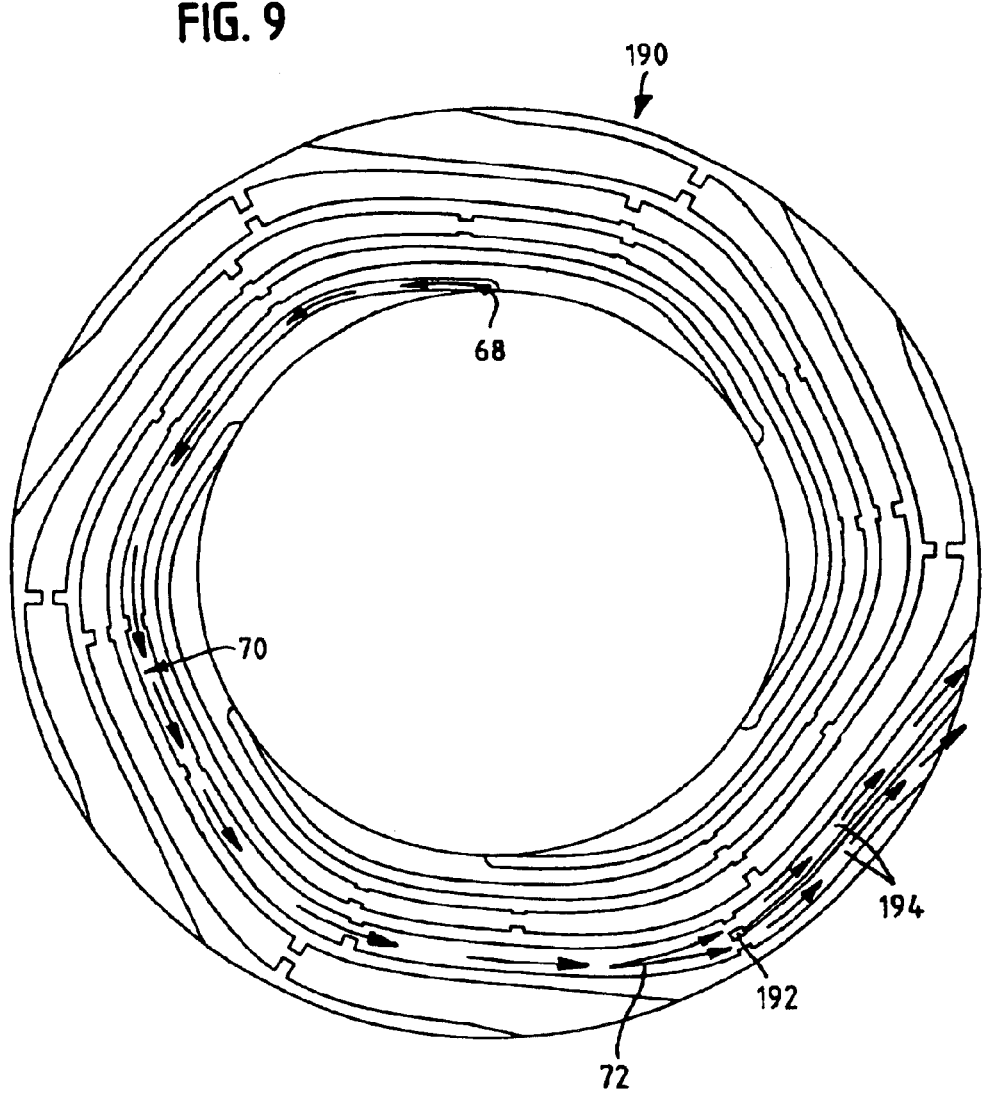
FIG. 9 is a plan view of a still further annular disk embodiment showing a flow path with multiple sub-outlets.

Referring now to FIG. 9, an annular disk 190 is shown having multiple sub-outlets 192. A flow path 62 is formed in the disk 190 having an inlet section 68, an intermediate section 70, and an outlet section 72. The inlet section 68 and intermediate section 70 may be formed in any of the manners described above with reference to the various embodiments. The outlet section 72, however, includes a splitting sub-flow section 192 that forms first and second sub-flow outlets 194. The multiple sub-flow outlets 194 increase the amount of contact between the fluid and the path walls, thereby increasing viscous drag.

While the present description is directed to including the fluid pressure reducing device of this invention in a throttling fluid control valve, it is understood that the invention is not so limited. The device may be implemented as a fixed restriction in a pipeline either upstream or downstream of a control valve, or entirely independent of the location of a control valve.

The foregoing detailed description has been given for clearness of understanding only, and no unnecessary limitations should be understood therefrom, as modifications will be obvious to those skilled in the art.

What is claimed is:

1. A fluid pressure reduction device comprising:

a plurality of stacked disks having a perimeter and a hollow center aligned along a longitudinal axis; and each disk having at least a first and a second flow path, each flow path having a generally spiral shape and continuously extending between the hollow center and the perimeter wherein at least the first and second flow paths spiral in generally opposite directions and the opposing walls of each flow path gradually diverge, each flow path being further comprised of an inlet section, an outlet section, and an intermediate section extending between the inlet and outlet sections;

wherein each flow path crosses at least one other flow path at at least one intersection; and wherein each of the flow path intermediate sections includes a recovery zone downstream of the intersection.

2. The fluid pressure reduction device of claim 1, in which the flow paths are directed toward the intersection at substantially the same plane, so that fluid flowing through each flow path undergoes an abrupt direction change at the intersection.

3. The fluid pressure reduction device of claim 1, in which at least the first flow path includes a first ramp upstream of the intersection directed to a first plane and the second flow path includes a second ramp upstream of the intersection directed to a second plane, so that fluid flowing through at least the first and second flow paths creates shear forces at the intersection.

4. The fluid pressure reduction device of claim 1, in which a common inlet section provides fluid entry for at least the first flow path and second flow path.

5. The fluid pressure reduction device of claim 4, in which the common inlet section is aligned along a radial disk reference line extending from the axis to the common inlet section so that substantially equal volumes of fluid enter the first and second flow paths.

6. A fluid pressure reduction device comprising:

a plurality of stacked disks having a perimeter and a hollow center aligned along a longitudinal axis; and the plurality of stacked disks defining at least one flow path extending between the hollow center and the perimeter, the flow path including an inlet section, an outlet section, and an intermediate section having a generally spiral shape and extending between the inlet and outlet sections, the flow path including a pressure reducing structure and a recovery zone positioned immediately downstream of the pressure reducing structure;

wherein a first disk of the plurality of stacked disks includes the inlet section and an upstream portion of the intermediate section, and a second disk of the plurality of stacked disks located adjacent the first disk includes the outlet section and a downstream portion of the intermediate section, the intermediate section upstream portion fluidly communicating with the intermediate section downstream portion.

* * * * *

UNITED STATES PATENT AND TRADEMARK OFFICE
CERTIFICATE OF CORRECTION

PATENT NO. : 6,935,370 B2  Page 1 of 1
APPLICATION NO. : 10/795831
DATED : August 30, 2005
INVENTOR(S) : McCarty et al.

It is certified that error appears in the above-identified patent and that said Letters Patent is hereby corrected as shown below:

In the Specification:
At Column 8, lines 12-13 please insert --a-- immediately before "pressure"

At Column 8, line 27, please insert --to-- immediately before "enhance"

At Column 9, line 32, please delete "at at least" and insert --at least--

At Column 10, line 17, please delete claim 6 in its entirety and insert the following claim in its place:
--Claim 6. A fluid pressure reduction device comprising:
a plurality of stacked disks having a perimeter and a hollow center aligned along a longitudinal axis; and
each disk having first and second flow paths extending between the hollow center and the perimeter, the first flow path including an inlet section, an outlet section, and an intermediate section extending between the inlet and outlet sections, the second flow path having an inlet section, an outlet section, and an intermediate section extending between the inlet and outlet sections;
wherein the second flow path intermediate section and first flow path intermediate section cross at an intersection such that the first flow path includes a first ramp upstream of the intersection directed to a first plane and the second flow path includes a second ramp upstream of the intersection directed to a second plane, so that fluid flowing through the first and second flow paths creates shear forces at the intersection; and
wherein each of the first and second flow path intermediate sections includes a recovery zone downstream of the intersection.--

Signed and Sealed this

Eighteenth Day of December, 2007

JON W. DUDAS
*Director of the United States Patent and Trademark Office*